US006981279B1

(12) United States Patent
Arnold et al.

(10) Patent No.: US 6,981,279 B1
(45) Date of Patent: Dec. 27, 2005

(54) METHOD AND APPARATUS FOR REPLICATING AND ANALYZING WORM PROGRAMS

(75) Inventors: William C. Arnold, Mahopac, NY (US); David M. Chess, Mohegan Lake, NY (US); John F. Morar, Mahopac, NY (US); Alla Segal, Mount Kisco, NY (US); Morton G. Swimmer, New York, NY (US); Ian N. Whalley, Pawling, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 09/640,453

(22) Filed: Aug. 17, 2000

(51) Int. Cl.$^7$ .......................... G06F 7/04; G06F 11/00; G06F 9/455; G06F 9/44
(52) U.S. Cl. .................. 726/22; 726/3; 726/5; 726/23; 726/24; 703/27; 714/28; 717/138
(58) Field of Search ................ 717/138; 713/200–202; 395/181, 186; 726/22, 3, 5, 23, 24; 714/28; 703/27

(56) References Cited

U.S. PATENT DOCUMENTS

| | | | | |
|---|---|---|---|---|
| 5,398,196 A | * | 3/1995 | Chambers | 714/28 |
| 5,440,723 A | | 8/1995 | Arnold et al. | 395/181 |
| 5,636,371 A | | 6/1997 | Yu | 395/500 |
| 5,734,865 A | | 3/1998 | Yu | 395/500 |
| 5,812,826 A | * | 9/1998 | McLain, Jr. | 703/27 |
| 5,826,013 A | * | 10/1998 | Nachenberg | 713/200 |
| 5,842,002 A | * | 11/1998 | Schnurer et al. | 395/180 |
| 5,978,917 A | * | 11/1999 | Chi | 713/201 |

OTHER PUBLICATIONS

Bishop et al., "An Isolated Network for Research", The 19th NISSC, pp. 1-9, (found at http://seclab.cs.ucdavis.edu/papers.html.), Oct. 1996.*
Bishop et al., "An Isolated Network for Research", Oct. 1996, The 19th NISSC, (http://seclab.cs.ucdavis.edu/papers. html.), pp. 1-9.*
*An Immune System for Cyberspace*, Kephart et al., IEEE, 1997, pp. 879-884.
*Biologically Inspired Defenses Against Computer Viruses*, Kephart et al., not dated, pp. 985-996.

* cited by examiner

*Primary Examiner*—Emmanuel L. Moise
*Assistant Examiner*—Courtney Fields
(74) *Attorney, Agent, or Firm*—Rafael Perez-Pineiro; Harrington & Smith, LLP

(57) ABSTRACT

A system and a method are disclosed for dynamically analyzing software, some of whose potentially-important behaviors (such as worm-like behavior) may only be displayed when the software is executed in an environment where it has, or appears to have, access to a production network and/or to the global Internet. The software can be executed in a real or an emulated network environment that includes a monitoring component and an emulation component. The monitoring component serves to capture and/or record the behaviors displayed by the software and/or other components of the system, and the emulation component gives the software being analyzed the impression that it is executing with access to a production network and/or to the global Internet. The software being analyzed is effectively confined to the analysis network environment, and cannot in fact read information from, or alter any information on, any production network or the global Internet.

46 Claims, 4 Drawing Sheets

METHOD AND APPARATUS FOR REPLICATING AND ANALYZING WORM PROGRAMS

CROSS-REFERENCE TO A RELATED PATENT APPLICATION

This patent application is related to copending and allowed U.S. patent application Ser. No. 09/041,493, filed Mar. 12, 1998, entitled "Automated Sample Creation of Polymorphic and Non-Polymorphic Macro Viruses", by Morton G. Swimmer et al., which claims priority from Provisional Application No. 60/066,382, filed Nov. 21, 1997.

FIELD OF THE INVENTION

This invention relates generally to methods and apparatus for analyzing undesirable software entities, such as those known as worms, and relates more particularly to methods and apparatus for replicating and analyzing worms in an emulated data processing and data communications environment.

BACKGROUND OF THE INVENTION

It is often necessary, in fields including but not limited to computer security and computer virus prevention, to analyze a program or other piece of software in order to determine its potential behavior, when no (or insufficient) information outside of the program itself is available to use in the determination. As part of such an analysis, it is often desirable to execute the software being analyzed in a real or in an emulated environment. This is sometimes referred to as dynamic analysis (as opposed to static analysis, which involves simply examining the binary contents of the software without allowing it to execute).

However, it has been found that for software whose important behaviors are different when executed in an environment where access to a network is available, and in particular when the software executes in an environment that has at least some access to the full global Internet, the dynamic analysis of the software becomes very difficult. Simply executing the software on a single isolated real or emulated system will not normally elicit the desired important behaviors. However, allowing the suspect software to execute on a production network, or with a connection to a real network or to the real Internet, is often impossible as well as undesirable.

U.S. Pat. No. 5,440,723 teaches the dynamic analysis of suspected computer viruses, by executing them in an environment where a number of "goat files" are available for infection, and U.S. Pat. Nos. 5,398,196 and 5,978,917 teach the use of emulation in the analysis of potentially-malicious software. However, these prior art systems do not specifically involve an analysis of network-dependant behavior, or the emulation of activity or services on a network. U.S. Pat. No. 5,812,826 teaches the use of an entirely emulated network to test the correct function of a monitoring and control system whose expected functions are already fully specified. However, this patent does not specifically address the analysis of individual pieces of software, or software whose behavior is unknown, or of software which must for safety or other reasons be isolated from real networks.

OBJECTS AND ADVANTAGES OF THE INVENTION

It is a first object and advantage of this invention to provide an improved system and a method for dynamically analyzing software.

It is another object and advantage of this invention to provide an improved system and a method for dynamically analyzing a type of software whose potentially-important behaviors may only be made manifest when the software is executed in an environment where it has, or appears to have, access to a production network and/or to the global Internet.

It is a further object and advantage of this invention to provide a system and a method for dynamically analyzing software that executes the software in a real or emulated network environment that includes a monitoring component and an emulation component, wherein the monitoring component captures and/or records behaviors displayed by the software and/or other components of the system, and wherein the emulation component provides the software being analyzed with the impression that it is executing with access to a production network and/or to the global Internet.

SUMMARY OF THE INVENTION

The foregoing and other problems are overcome and the objects of the invention are realized by methods and apparatus in accordance with embodiments of this invention.

This invention provides a system and method for dynamically analyzing software, at least some of whose potentially-important behaviors may only be displayed when the software is executed in an environment where it has, or appears to have, access to a production network and/or to the global Internet. The software is executed in a real or emulated network environment that includes a monitoring component and an emulation component. The monitoring component serves to capture and/or record the behaviors displayed by the software and/or other components of the system, and the emulation component gives the software being analyzed the impression that it is executing with access to a production network and/or to the global Internet. In a preferred embodiment, the software being analyzed is effectively confined to the analysis network environment, and cannot in fact read information from, or alter any information on, any production network or the global Internet.

The teachings of this invention provide a system, method and a computer program, such as one embodied on at least one computer-readable medium. In accordance with a method for eliciting a behavior from a software program, such as the suspect file, steps are executed of (a) emulating a data communications network having at least one emulated network server coupled thereto, where the at least one emulated network server may operate as an optimistic server when responding to requests received from the emulated data communications network. A further step (b) emulates a host computer, also referred to as a replicator server or host, that is coupled to the emulated data communications network, where the emulated host computer executes the software program. The software program operates to originate requests to the emulated data communications network. A further step (c) may emulate at least one goat computer that is coupled to the emulated data communications network; and another step (d) detects an occurrence of the desired behavior in at least one of the emulated network server, the emulated host computer and, if present, the at least one emulated goat computer. The desired behavior can be indicative of, for example, a presence of an undesirable software entity, such as a worm or a virus, within the suspect software program. The desired behavior can be self-replication, and/or viral activity or some malicious activity such as modification or deletion of a file. The step of detecting operates to detect, by example, at least one of a creation of a new file, a receipt of mail, an opening of mail, a posting of news, an opening of a new socket connection, an execution of a particular application, and an alteration of a system registry.

Other embodiments of this invention can include, but need not be limited to, software reverse-engineering systems and software testing and debugging systems.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
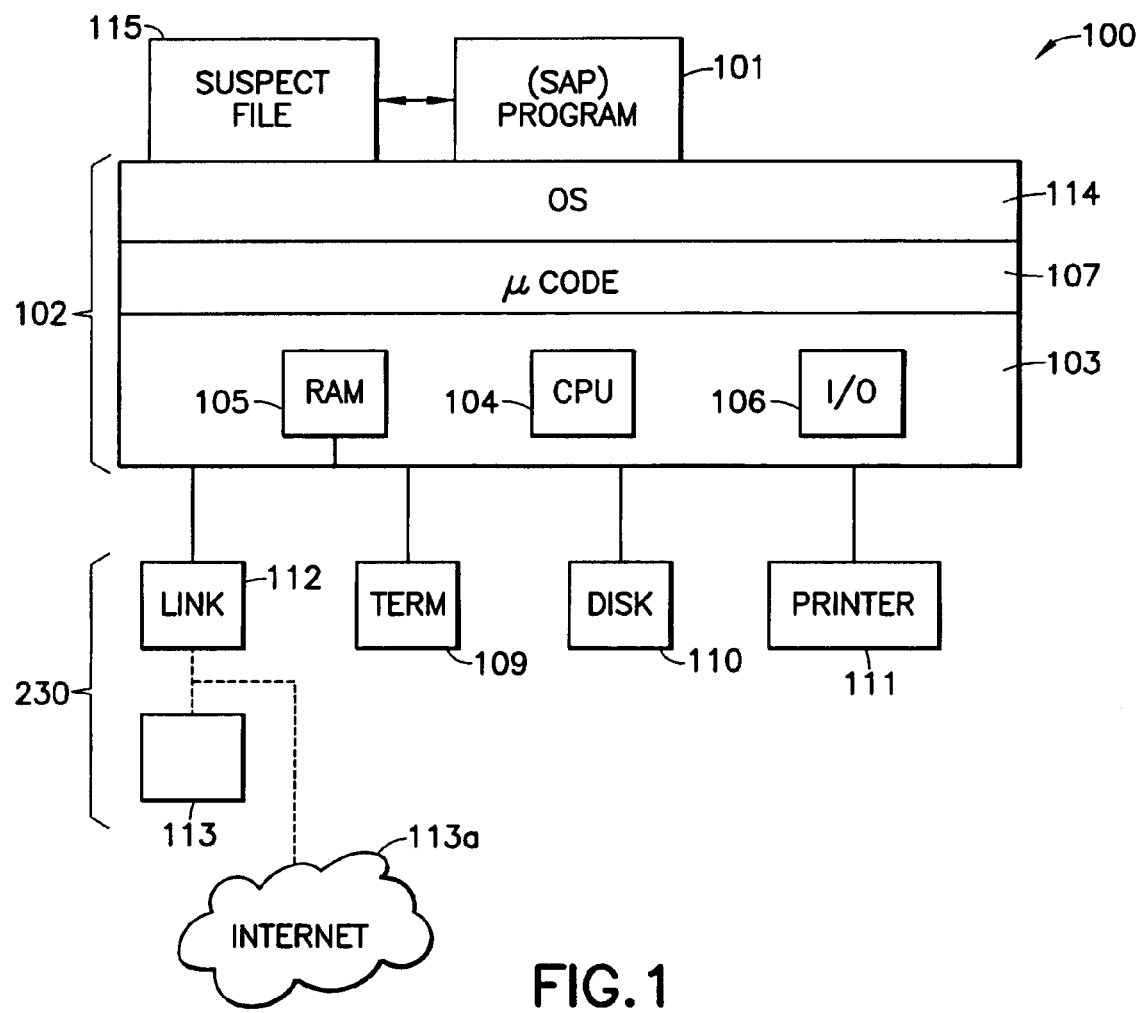
FIG. 1 is a block diagram of a data processor that is suitable for use in implementing this invention.

FIG. 1 is a block diagram showing an exemplary data processing or computer system 100 on which a preferred embodiment of the present invention operates. The computer system 100 includes a computer platform 102 having a hardware unit 103, and a software-analyzing program (SAP) 101 that implements the methods disclosed below. The SAP 101 operates on the computer platform 102 and hardware unit 103. The hardware unit 103 typically includes one or more central processing units (CPUs) 104, a random access memory (RAM) 105 and an input/output (I/O) interface 106. Microinstruction code 107, for example a reduced instruction set, may also be included on the platform 102. Various peripheral components may be connected to the computer platform 102. Typically provided peripheral components include a display 109, a data storage device (e.g. tape or disk) 110, and a printing device 111. A link 112 may also be included to connect the system 100 to one or more other similar computer systems shown simply as the block 113. The link 112 is used to transmit digital information between the computers 100 and 113. The link 112 may also provide access to the global Internet 113a. An operating system 114 coordinates the operation of the various components of the computer system 100, and is also responsible for managing various objects or files, and for recording certain information regarding same, such as date and time last modified, file length, etc. A suitable example of computer system 100 is the IBM IntelliStation™ (IntelliStation is a trademark of the International Business Machines Corporation). It is expected that those skilled in the art will be familiar with many equivalent computer systems 100, and the teachings of this invention are not to be construed to be limited in any way to the specific architecture depicted in FIG. 1.

In a presently preferred embodiment of this invention the SAP 101 has access to a collection of objects, such as files 115, which in some embodiments may be also referred to as "suspect" files 115 or as "potentially infectable" objects or files 115. The collection of potentially infectable objects, such as the suspect files 115, can comprise, by way of example, documents, executables, files and boot records that are stored on the disk 110, and which may also possibly be resident in the RAM 105.

The preferred embodiment of this invention comprises a system and method for the replication and analysis of "worm" programs. As employed herein, a worm program is one which can clandestinely send a copy of itself between computers on a computer network, and which uses a network service or services to replicate. Examples of such network services include, but are not limited to, routing, name resolution and mail storage.

However, and as was mentioned previously, other embodiments of this invention can include, but need not be limited to, reverse-engineering systems and testing and debugging systems.

Figure 2:
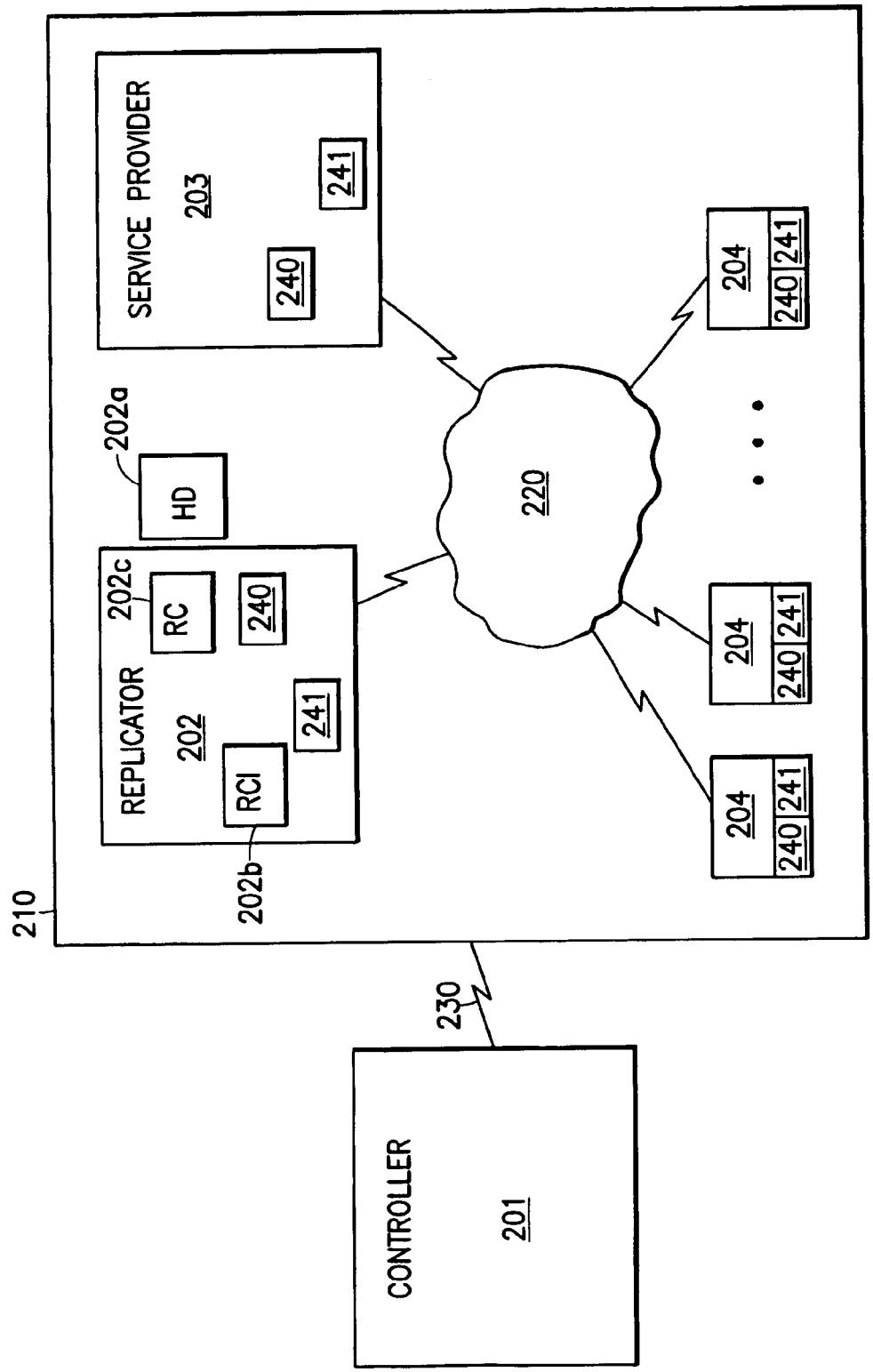
FIG. 2 is a logical block diagram of a software monitoring and host/network emulation system in accordance with these teachings.

Referring now as well to FIG. 2, in this embodiment the system contains of a number of host computers, one of which is a controller 201, one of which is a replicator 202, one of which is a service provider 203, and the remainder of which are at least one, but typically a plurality of "goat" hosts 204. In a preferred embodiment the replicator 202, service provider 203 and goat hosts 204 can all be emulated host computers, and may all reside (logically) on the same physical machine 210 (such as the data processor 100 shown in FIG. 1). However, other embodiments can instead employ a plurality of different physical machines. Also, in other embodiments there may be multiple controllers 201, multiple replicators 202, multiple service providers 203, and/or multiple different types of goat hosts 204.

A function of the replicator host 202 is to accept a possible worm sample (suspect file 115) and attempt to replicate it. In the preferred embodiment the replicator 202 is an emulated computer that emulates the interfaces required for replication. In a setup process, prior to execution, an operating system and any applications required for replication (e.g., an email application) can be installed on an emulated hard disk (HD) 202a of the replicator 202. In a preferred embodiment the emulated HD 202a can be loaded from one of a set of pre-installed disk images that contain the operating system and various application programs typically required by worms. If a loaded disk image does not elicit worm replication from a suspect file 115, then another disk image can be selected from the set of disk images, loaded and then tried.

In the preferred embodiment of this invention the programs executing within the emulated host computers can access only an isolated or emulated network 220, and not a real physical network 230 to which real physical computers are attached. This physical network 230 is shown in FIG. 1 to encompass the link 112, the other computers 113 (one of which can be the controller 201), as well as (optionally) the global Internet 113a. The emulated network 220 preferably provides a wide range of network services to enhance the probability that a worm, if present, will replicate. The service provider host 203 may thus provide standard Internet services such as, but not limited to, http, ftp, imap4, pop3, nntp, and other services. These services are preferably configured in an advantageous way to allow a worm, if present, to replicate. For example, a ftp server preferably allows a writable directory to exist, with infectable targets that can in turn be downloaded and used by the goat hosts 204. This enables a worm to spread through the goat hosts 204 by using ftp. Another example provides the ftp server component of the service provider 203 with user directories that a user (e.g., an emulated user) can read from and write to using a password stored in a standard location in the replicator host 202 and the goat hosts 203.

The service provider server 202 can optionally be programmed to determine what result to return based at least in part on a result of a corresponding real query sent to a corresponding real server on a corresponding real, non-isolated network, such as the real global Internet 113*a*.

Figure 3A:
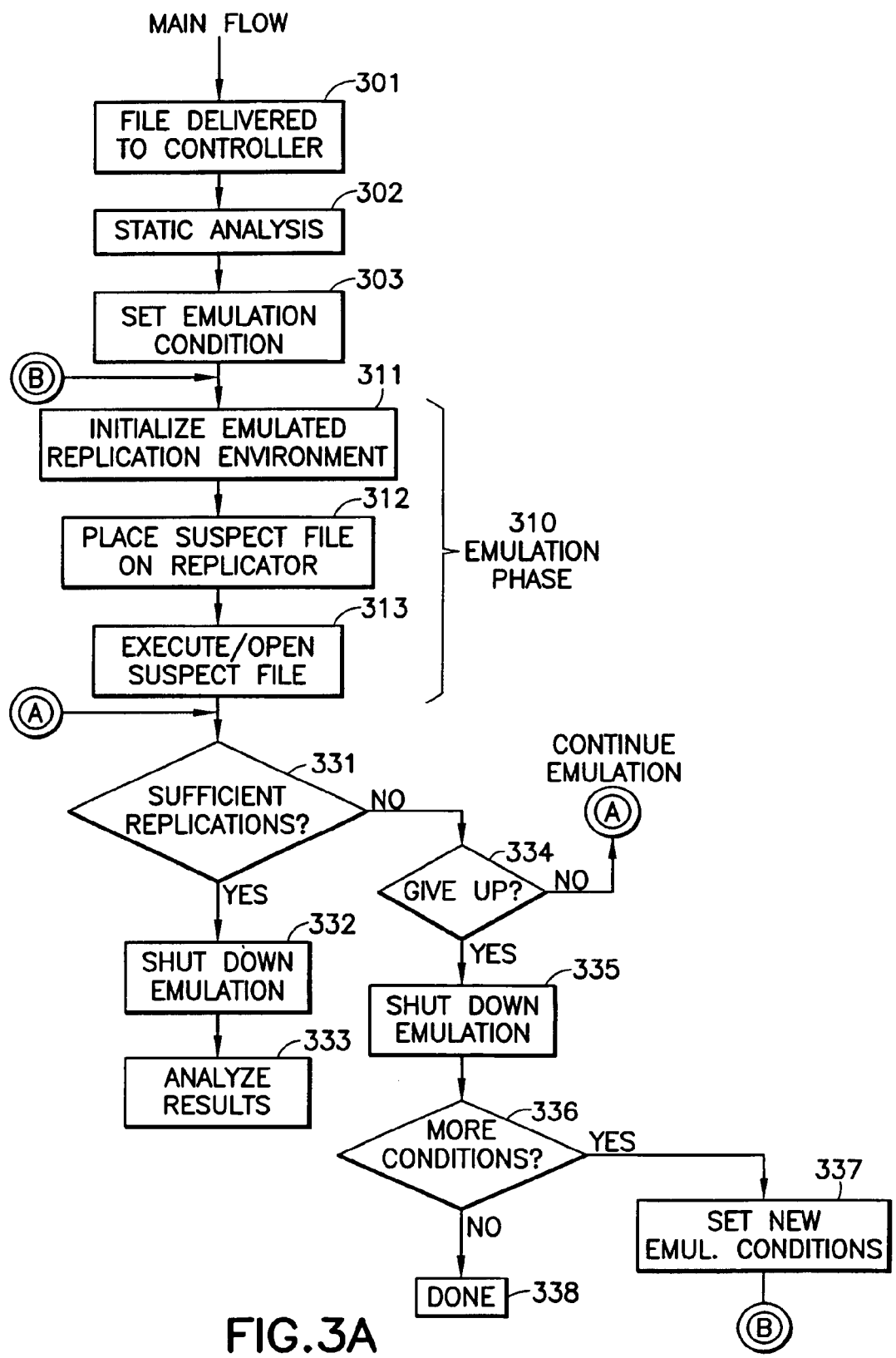
FIGS. 3A and 3B are logic flow diagrams that illustrate a method in accordance with these teachings.

Referring now also to the logic flow diagram of FIG. 3A, when a suspect file 115 is to be analyzed, it is first delivered (Step 301), typically via the actual, non-emulated network 230, to the controller 201. The controller 201 may carry out a limited amount of static analysis 302, examining the static properties of the suspect file, assigning it a probable type reflecting the execution environment or environments that it appears to be intended to run under (the CPU-type for a binary program, the application-type for a document containing macros, and so on), and choosing at Step 303 an initial set of emulation conditions to be used during the emulation phase 310 (Steps 311, 312, 313). In other embodiments, these decisions could be made dynamically during the emulation phase 310, or some preselected set or subset of all possible execution environments and emulation conditions may be attempted in turn.

In the emulation phase 310, the emulated network environment, including the emulated replicator 202, service provider 203, the goat hosts 204, and the emulated network 220 connecting them, is initialized at Step 311 according to the initial emulation conditions selected by the controller 201. Typically, the suspect file 115 is placed at Step 312 onto the emulated hard disk (HD) 202*a* of the replicator 202, and then executed at Step 313. Within all the emulated host machines 202, 203, 204 in the emulated network 220 environment, activity generators 240 and activity monitors 241 can be provided for recording the events that occur, and for generating emulated traffic and other activity in an attempt to elicit replication (or other behavior of interest) from the suspect file 115. The activity monitors 241 may be thought of as event handlers that monitor the system activity for, by example, file activity such as the creation of a new file on the emulated hard drive 202*a*, registry changes, and/or an arrival of email. An application handler (e.g. Lotus™ Notes™ script) can also be provided. Further by example, if the application is Lotus Notes™, a Lotus Notes™ agent is created at system setup time to run a specific sequence of steps every time a new email is received.

Figure 4:
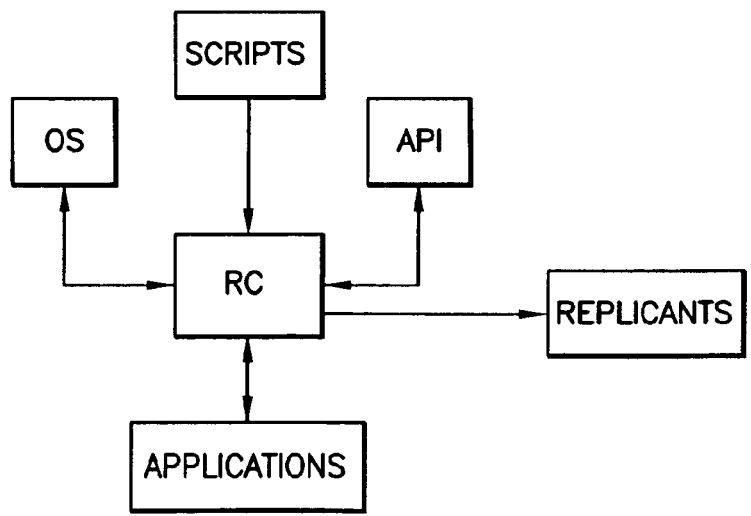
FIG. 4 is a diagram that illustrates a replication controller and its interconnectivity with various system functions and services.

Typically, an application agent reacts to the arrival of the email by opening it, checking it for an attachment and, if one is present, detaching it and invoking an appropriate function of a replication controller interface (RCI) 202*b*. The RCI 202*b* includes interfaces that allow the communication between the event handlers, such as the activity monitors 241, and the various functions of the replicator controller (RC) 202*c*. For example, COM technology can be used to implement this interface, where the replication controller 202*c* is implemented as a COM object, and its exposed functions are invoked directly by the event handler. FIG. 4 shows the RC 202*c* and a typical interconnectivity with various system services and functions.

If services required to react to received email are not provided by the selected email application, the functionality to open mail and/or detach attachments can be provided by the replication controller 202*c* itself. In this case the RC 202*c* can automate the mail application by simulating the user's actions such as sending keystrokes or Windows™ commands to open the mail and to detach the attached file. Since the application being used is known at setup time, the appropriate scripts for the email application's automation can also be provided at setup time.

Once the attachment is detached or a new file is detected, the RC 202*c* can determine its subsequent course of action based on the type of the file. For example, if the attachment or new file has a .doc extension, the RC 202*c* can launch Microsoft Word™ and execute appropriate scripts in an attempt to elicit macro replication. If a new file is a win32 executable, the RC 202*c* can instead invoke a win32 replication controller and then follow steps for win32 replication, such as running the executable, opening and closing goat files, executing goat files, etc. Reference in this regard may be had, for example, to the above referenced U.S. patent application Ser. No. 09/041,493, filed Mar. 12, 1998, entitled "Automated Sample Creation of Polymorphic and Non-Polymorphic Macro Viruses", by Morton G. Swimmer et al. While performing these steps, the RC 202*c* preferably monitors the activity monitor(s) 241 for occurrences of file changes, installation of services and drivers, registry changes, changes to installation files, and other signs of activity by an undesirable software entity, such as worms and viruses.

The selection of which scripts to use depends on the applications installed, which depends in turn on the type of file the possible worm resides in. The file type is determined at setup time, and thus the appropriate applications and scripts are preferably installed at that time.

In the preferred embodiment, while attempting worm replication, the RC 202*c* tries as well to observe local replication (i.e., in the replicator host 202) in the event that the suspect worm instead or also exhibits file virus properties. While this is not a requirement for worm replication, its use is preferred to provide a complete analysis.

In an alternate embodiment, the scripts can be dispatched from the controller 201. This allows for a coordinated replication of the worm. In this embodiment the RC 202*c* receives the scripts from the controller 201 vis the network link 230, or through some other channel, and acts on them in an appropriate fashion.

The RC 202*c* may also monitor the installation of services and drivers and can react to them by restarting the virtual machine or by any other appropriate measure. For example, if the worm installs itself as a system service it will not generally actively infect until the system is restarted.

In general, the activity generators 240 are programmed to emulate typical or specific system activity on at least one of the isolated (emulated) network 220 and the real or emulated host computer(s) 202, 203 and/or 204. The typical or specific activity that is emulated can include, but is not limited to, at least one of sending mail, opening mail, opening or executing a mail attachment, entry of keystrokes, issuing of user commands, execution of a particular application, rebooting a real or emulated host computer, restarting a real or emulated host computer, reinitializing a real or emulated host computer, posting of news, participation in real-time messaging (e.g., "chat"), and a transfer of files.

The activity monitor 241 may function as well as an event handler that is programmed so as to obtain control when a certain event or events, or a certain type of event or events, occur. The certain events or types of events can include, but are not limited to, at least one of creation of a new file in a filesystem, a receipt of mail, an opening of mail, a posting of news, an opening of a new socket connection, an execution of a particular application, and an alteration of a system registry.

The goat hosts 204 are generally similar to the replicator host 202. An important distinction, in the preferred embodiment, is that no suspect worm sample is intentionally installed, and the scripts are reactive or not specific to the sample.

The controller 201 generally controls the overall worm replication process. The controller 201 is preferably "hardened" against the other hosts attached to the emulated network 220 and is responsible for setting up the other hosts (202, 203, 204), starting and stopping the other hosts, and the analysis of resulting log files and (emulated) hard disks, such as the HD 202a.

In the preferred embodiment the controller 201 is the host machine, and disk images for the emulated hosts 202, 203 and 204 reside in the host machine's file system. In an alternative embodiment, where real machines are used for the hosts 202, 203 and 204, the disk images can be retrieved from or stored to these machines via the isolated network 220. These disk images can be compared to the original disk images, and any changes can be treated as a suspect infection by a worm (or a virus). Any changes to or additions of executable files are flagged as especially suspicious, and merit further analysis.

Figure 3B:
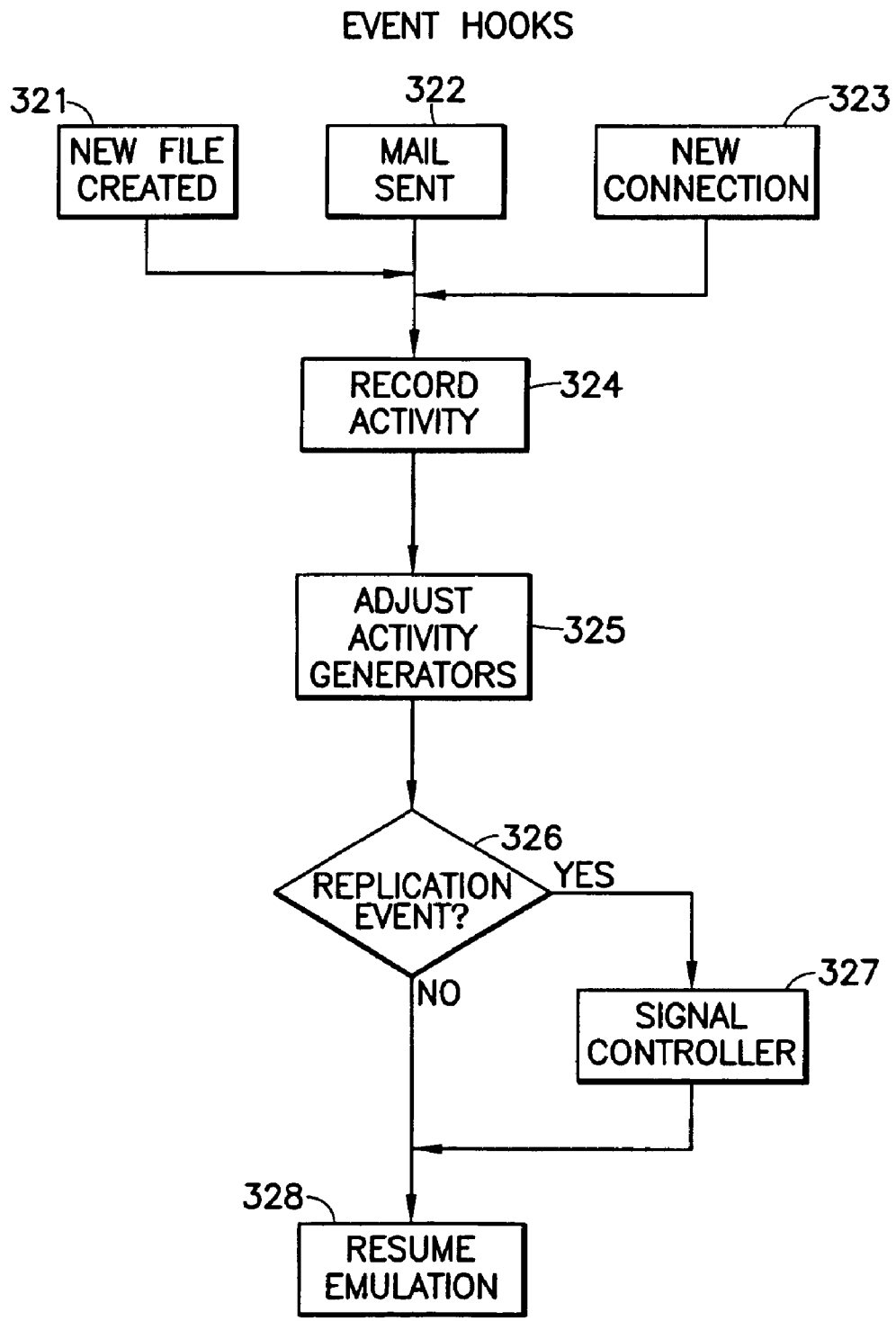

Referring now also to FIG. 3B, whenever a new file is created 321, a piece of mail sent 322, or a network connection established 323, the activity monitors 241 record the event activity 324 for later analysis, and also for real-time modification 325 of the traffic and other activity generated by the activity generators 240. In different embodiments of this invention, the traffic and other activity generated by the activity generators 240 may be entirely determined in advance, may be entirely chosen in real-time in response to the activity noted by the activity monitors 241, or a combination of these two approaches may be used. In embodiments where only one, or a small number of very specific behaviors of the suspect file 115 are of interest, a more limited set of activity monitors 241 may be employed.

A function of the service provider emulated host computer 203 is to carry out and/or emulate the various network services that would be found in the actual network being emulated. These network services can include, by example, routing, name resolution, mail storage, Usenet news services, and so on. The service provider host 203 may implement or emulate at least one of an irc server, a chat server, a smtp server or a pop3, imap or other type of mail server. In different embodiments of this invention different services may be provided and/or emulated by the service provider 203. In the preferred embodiment, the service provider 203 also contains activity generators 240 and activity monitors 241, so that actions that result from the suspect file's presence in the emulated system can be recorded, and traffic and other activity generated in a way that is most likely to elicit the desired replication behavior. When the suspect file 115, or any other program in the system, attempts to make queries of the production network or global Internet being emulated by 220, the service provider 203 returns results and information that mimic, to the required extent, the behavior of a real server situated in the corresponding real network (such as the global Internet 113a). The details of the results and other activity provided by the service provider host computer 203 depend on the initial emulation conditions set up by the controller 201, and optionally on the activity so far recorded by the various activity monitors 241 and by the service provider 203 itself.

There are a number of different ways that the service provider emulated host computer 203 may respond to requests that it receives from programs running on the replicator 202 and/or the goat host(s) 204. In a preferred embodiment, the service provider 203 functions as an "optimistic" host or server and attempts, if possible, to always give a positive response; that is, to indicate success rather than failure, to return information rather than an error message, and in general to reply in such a way that the program making the request is likely to proceed with whatever actions it is performing. For example, if the service provider 203 receives a Domain Name Service (DNS) message requesting the address of a host with a particular name, the service provider 203 can return a reply to the effect that the host with that name has a certain address, where the address is one that (within the context of the emulated network environment 220) corresponds to the service provider host 203 itself. The service provider 203 can also include a real or an emulated WINS or other Name server. As another example, when the service provider 203 receives a Hypertext Transfer Protocol (HTTP) request for a given Web page, it returns a reply containing some data (either loaded from a standard template, or generated on the fly), rather than returning an indication that the requested Web page does not exist. Similarly, requests to open a file always return an indication of success, and attempts to read data from a file always return with some data. In a practical sense, however, it can be realized that certain types of requests will result in an error return eventually. For example, if the service provider 203 receives multiple requests to read sequentially from a particular resource, it should eventually return an indication that all of the data has been read, so that the process making the read requests can continue its processing.

Further by example, the service provider 203 can implement a real or an emulated SNMP server, or a real or an emulated NetBIOS server.

It is also within the scope of these teachings that the service provider 203, or some other real or emulated host, can comprise a real or an emulated server that operates in accordance with a System Message Block (SMB) protocol, a Network File System (NES) protocol, or some other distributed file system protocol.

The data returned by the service provider 203 may be obtained in a number of ways. For some types of requests, especially read requests, the service provider 203 can itself make the corresponding request on the actual external network 230, and relay to the requesting process within the emulated network 220 the data that it receives in response. For other types of requests, the service provider 203 may return data that is provided by the controller 201 as part of the emulation conditions, or it could return standard data read from a file, or data that is constructed dynamically with the aid of a random number generator. Other possibilities should be readily apparent to those skilled in the art.

Still referring to FIG. 3B, if the activity monitors 241 determine at Step 326 that an observed activity is likely to be an instance of worm replication, a signal may be sent at Step 327 back to the controller 201 or to some other host to record or log the event, and emulation is resumed at Step 328.

Referring again to FIG. 3A, when some desired number of replications have occurred (Step 331), the emulated system is shut down by the controller 201 at Step 332, so that the results of the emulation may be further analyzed at Step 333. In other embodiments, the emulation may always be allowed to run for a certain amount of time, or until a certain number of other events have been recorded or emulated, and the results then analyzed for occurrences of replication or other salient events only after shutdown. Similarly, if the emulation runs for some period of time without any replication events being observed (Step 334), the controller 201 may shut down the emulation at Step 335, make a determination at Step 336 whether more conditions should be tried, and then, optionally, restart the emulation at Step 337 with a different set of initial emulation conditions, until either sufficient replications have occurred at Step 331 or all applicable initial emulation conditions have been attempted. If the latter condition occurs the emulation process may terminate at Step 338. Other retry and termination conditions than those specifically disclosed above are possible.

It should be noted that the embodiments described thus far have been specialized for the discovery of worm-like behavior in suspect programs and suspect files 115. However, in other embodiments of these teachings the system may elicit and record other types of behavior. For example, a general reverse-engineering system making use of this invention might record every file that is read from or written to by the file 115, as well as every communication socket that is opened. Further by example, a testing and debugging system might compare the behavior of the file 115 with a desired or specified function that the file is intended to implement. Based on these teachings other possibilities may occur to those skilled in the art. In these other embodiments the goat host(s) 204 may or may not be required.

Based on the foregoing description it can be appreciated that an aspect of this invention is a computer program embodied on at least one computer-readable medium for executing a method for eliciting a desired behavior from a software program, such as the suspect file 115. The method has steps of (a) emulating the data communications network 220 having at least one emulated network server 203 coupled thereto, where the at least one emulated network server 203 operates preferably, but not necessarily, as an optimistic server when responding to requests received from the emulated data communications network; and (b) emulating the host computer 202 that is coupled to the emulated data communications network 220, where the emulated host computer 202 executes the suspect software program. The suspect software program operates to originate requests to the emulated data communications network 220. A further step (c) may emulate at least one goat computer 204 that is coupled to the emulated data communications network 220; and another step (d) detects an occurrence of the desired behavior in at least one of the emulated network server 203, the emulated host computer 202, and the at least one emulated goat computer 204. The desired behavior may be indicative of a presence of an undesirable software entity, such as a worm or a virus, within the suspect software program. The desired behavior may be self-replication, and/or viral activity or some malicious activity.

The step of detecting operates to detect, by example, at least one of a creation of a new file, a receipt of mail, an opening of mail, a posting of news, an opening of a new socket connection, an execution of a particular application, and an alteration of a system registry.

While the invention has been particularly shown and described with respect to preferred embodiments thereof, it will be understood by those skilled in the art that changes in form and details may be made therein without departing from the scope and spirit of the invention.

What is claimed is:

1. A system for monitoring operation of a software program in a network environment, comprising:
an execution component for executing the software program, said execution component being coupled to an isolated network that does not have a direct connection to another network that is not an isolated network;
a monitoring component for obtaining information about actions performed by the software program; and
a network emulation component, coupled to said isolated network, for emulating the behavior of at least a host providing network services; wherein
said execution component and said network emulation component cooperate with said isolated network in order to elicit a behavior of the software program that is detectable by said monitoring component.

2. A system as in claim 1, where said emulation component further comprises a server programmed so as to return emulated results in response to a request resulting from the software program being executed on said execution component.

3. A system as in claim 1, where said emulation component is programmed so as to limit access by the software program to only certain resources.

4. A system as in claim 1, where at least one of said emulation component and monitoring component are programmed so as to provide information about the performance of the software program for the purposes of testing, debugging, performance profiling, or optimization.

5. A system as in claim 1, where at least one of said emulation component and monitoring component are programmed so as to provide information about actions of the software program for the purposes of reverse engineering or otherwise determining the function and behavior of the software program.

6. A system as in claim 1, where at least one of said emulation component and monitoring component are programmed so as to provide information about actions of the software program for the purposes of detecting a presence of an undesirable software entity within the software program.

7. A system as in claim 6, wherein the undesirable software entity comprises at least one of a worm or a virus.

8. A system as in claim 6, wherein the undesirable software entity comprises a worm that exhibits viral characteristics.

9. A system as in claim 1, where the elicited behavior of the software program comprises self-replication.

10. A system as in claim 1, where the elicited behavior of the software program comprises viral or malicious activity.

11. A system as in claim 2, where said server is programmed to determine what result to return based at least in part on a result of a corresponding real query sent to a corresponding real server on a corresponding real, non-isolated network.

12. A system as in claim 2, where said server is programmed so as to function as an optimistic host.

13. A system as in claim 2, where said server comprises at least one of a real or an emulated Web server.

14. A system as in claim 2, where said server comprises at least one of a real or an emulated http, ftp, imap4, pop3, nntp, news, irc, chat, smtp, mail or mailbox server.

15. A system as in claim 2, where said server comprises at least one of a real or an emulated router.

16. A system as in claim 2, where said server comprises at least one of a real or an emulated DNS, WINS, or other Name server.

17. A system as in claim 2, where said server comprises at least one of a real or an emulated SNMP server.

18. A system as in claim 2, where said server comprises at least one of a real or an emulated NetBIOS server.

19. A system as in claim 2, where said server comprises at least one of a real or an emulated server that operates in accordance with SMB, NES or other distributed file system protocols.

20. A system as in claim 1, where said monitoring component comprises a monitor programmed to record certain information or types of information that flow across the isolated network as a result of the execution of the software program.

21. A system as in claim 1, where said monitoring component comprises a monitor programmed to record at least one of certain operating system level or application level activities or types of activities that occur in real or emulated host computers as a result of the execution of the software program.

22. A system as in claim 2, where said monitoring component comprises a monitor programmed to record at least certain activities or types of activities that occur in said server as a result of the execution of the software program.

23. A system as in claim 1, where said monitoring component comprises at least one event handler programmed so as to obtain control when certain events or types of events occur.

24. A system as in claim 23, where the certain events or types of events comprise at least one of creation of a new file in a filesystem, a receipt of mail, an opening of mail, a posting of news, an opening of a new socket connection, an execution of a particular application, and an alteration of a system registry.

25. A system as in claim 1, where said emulation component further comprises a system activity emulation component for emulating typical or specific activity on at least one of said isolated network and a real or emulated host computer.

26. A system as in claim 25, where the typical or specific activity comprises at least one of sending mail, opening mail, opening or execution of a mail attachment, entry of keystrokes, issuing of user commands, execution of a particular application, rebooting a real or emulated host computer, restarting a real or emulated host computer, reinitialization of a real or emulated host computer, posting of news, participation in real-time messaging, and a transfer of files.

27. A system for eliciting a desired behavior from a software program, comprising:
   an emulated data communications network having at least one emulated network server coupled thereto, said at least one emulated network server responding to requests received from said emulated data communications network;
   an emulated host computer coupled to said emulated data communications network, said emulated host computer for executing the software program, the software program operating to originate requests to said emulated data communications network;
   at least one emulated goat computer coupled to said emulated data communications network; and
   at least one monitor for detecting an occurrence of the desired behavior in at least one of said emulated network server, said emulated host computer, and said at least one emulated goat computer.

28. A system as in claim 27, wherein said at least one emulated network server operates as an optimistic server when responding to requests received from said emulated data communications network.

29. A system as in claim 27, wherein the desired behavior is indicative of a presence of an undesirable software entity within the software program.

30. A system as in claim 29, wherein the undesirable software entity comprises at least one of a worm or a virus.

31. A system as in claim 29, wherein the undesirable software entity comprises a worm that exhibits viral characteristics.

32. A system as in claim 27, where the desired behavior comprises self-replication.

33. A system as in claim 27, where the desired behavior comprises viral activity or malicious activity.

34. A system as in claim 27, wherein said monitor operates to detect at least one of a creation of a new file, a receipt of mail, an opening of mail, a posting of news, an opening of a new socket connection, an execution of a particular application, and an alteration of a system registry.

35. A system as in claim 27, where at least one of said emulated host computer and said monitor are programmed so as to provide information about the performance of the software program for the purposes of testing, debugging, performance profiling, or optimization.

36. A system as in claim 27, where at least one of said emulated host computer and said monitor are programmed so as to provide information about the performance of the software program for the purposes of reverse engineering or otherwise determining the function and behavior of the software program.

37. A computer program embodied on at least one computer-readable medium for executing a method for eliciting a behavior from a software program, the method comprising steps of:
   emulating a data communications network having at least one emulated network server coupled thereto, said at least one emulated network server operating to respond to requests received from said emulated data communications network;
   emulating a host computer coupled to said emulated data communications network, said emulated host computer executing the software program, the software program operating to originate requests to said emulated data communications network; and
   detecting an occurrence of the behavior in at least one of said emulated network server and said emulated host computer.

38. A computer program as in claim 37, and further comprising a step of emulating at least one goat computer coupled to said emulated data communications network, and wherein the step of detecting an occurrence of the behavior detects the occurrence of the behavior in said at least one goat computer.

39. A computer program as in claim 37, wherein the elicited behavior is indicative of a presence of an undesirable software entity within the software program.

40. A computer program as in claim 38, wherein the elicited behavior is indicative of a presence of an undesirable software entity within the software program, and wherein the undesirable software entity comprises at least one of a worm, a virus, or a worm that exhibits viral characteristics.

41. A computer program as in claim 37, wherein the elicited behavior comprises self-replication.

42. A computer program as in claim 37, wherein the elicited behavior comprises worm-like or virus-like behavior.

43. A computer program as in claim 37, wherein said step of detecting operates to detect at least one of a creation of a new file, a receipt of mail, an opening of mail, a posting of news, an opening of a new socket connection, an execution of a particular application, and an alteration of a system registry.

44. A computer program as in claim 37, wherein said at least one emulated network server operates as an optimistic server.

45. A computer program as in claim 37, wherein said method provides information about the performance of the software program for the purposes of testing, debugging, performance profiling, or optimization.

46. A computer program as in claim 37, wherein said method provides information about the performance of the software program for the purposes of reverse engineering or otherwise determining the function and behavior of the software program.

\* \* \* \* \*